1,891,635

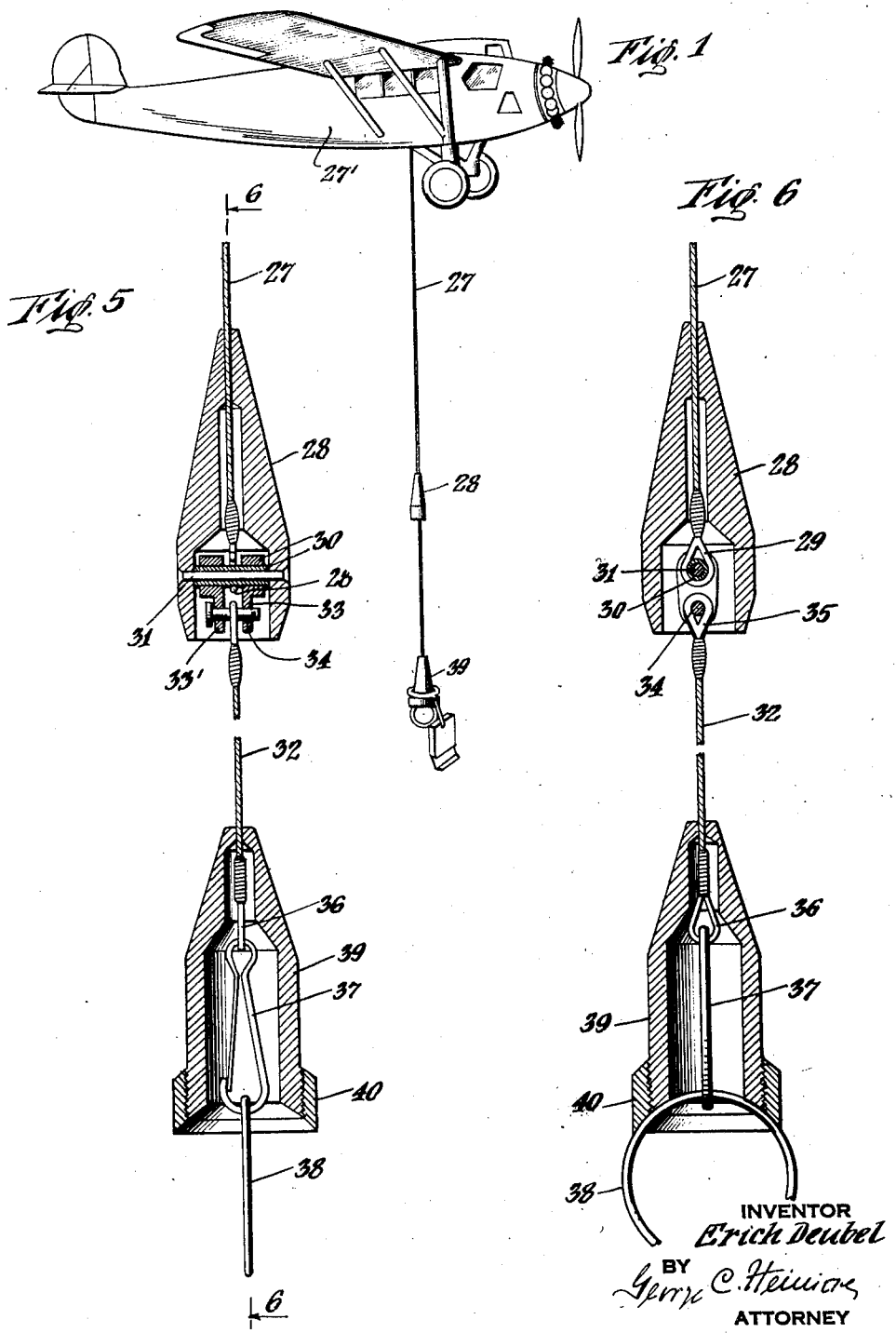

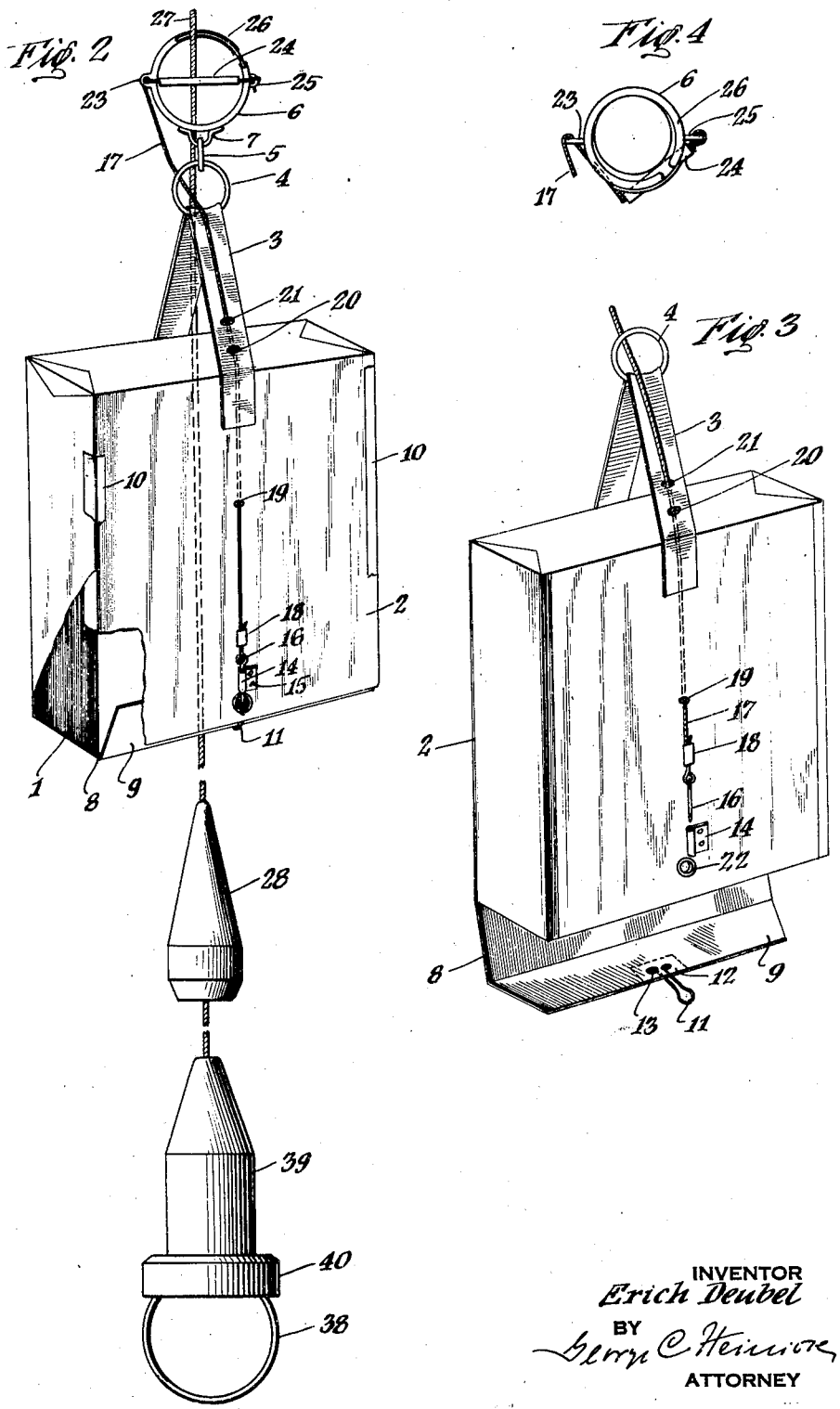
Dec. 20, 1932.   E. DEUBEL   1,891,635
MEANS FOR RELEASING OBJECTS TO BE DROPPED FROM AIRCRAFT
Filed Feb. 4, 1932   2 Sheets-Sheet 2
INVENTOR
Erich Deubel
BY
ATTORNEY Patented Dec. 20, 1932

UNITED STATES PATENT OFFICE

ERICH DEUBEL, OF BROOKLYN, NEW YORK

MEANS FOR RELEASING OBJECTS TO BE DROPPED FROM AIRCRAFT

Application filed February 4, 1932. Serial No. 590,860.

This invention relates to a method and apparatus for releasing objects from aircraft, and it is the principal object of my invention to wrap the objects into a container or wrapper and to release and drop the contents of these packages in any desired number and successive order and to open the same at any desired distance from the ground determined by the length of a cable paid out from the aircraft.

Another object of my invention is the provision of a releasing device of this type equipped with a single cable which is only slightly worn in consequence of the singular construction of the wrapped contents releasing means, so as to allow the use of comparatively light cables only consequently resulting in a saving of time and space greatly increasing the loading capacity carried by the aircraft.

Still another object of my invention is the provision of a releasing device for aircraft permitting of the dropping of objects of light weight in a manner that undesirable drifting of the same is neither caused by the propeller and the air current created during the flight, nor by the prevailing wind direction or strength, as it would be the case if these objects were dropped in loose quantities.

A further object of my invention is the provision of a releasing device for pamphlets for propaganda or other purposes during flight, allowing the release and unfolding of the same at a certain distance from the ground determined by the length of the cable, so that a loss of pamphlets by drifting is avoided while the aircraft is held at such a distance from the ground that a forced landing becoming suddenly necessary will not endanger the life of persons.

A still further object of my invention is the provision of a device of the above character allowing the release of explosives such as bombs, or the like, from an aircraft in flight at any desired distance from the ground determined by the length of the cable used and which may be immediately exploded or the explosion of which may be delayed for a predetermined length of time so that enemy aircraft, and targets on land or water may be combatted by shrapnel or grenade or shell splinters without the necessity of making direct hits with the bombs while the aircraft may fly at a distance from the ground at which it is comparatively safe against enemy fire.

Furthermore, I can release by means of my device incendiary bombs during flight which are brought to action at a predetermined distance from the ground determined by the length of the cable used and come either to momentary or delayed action without that it becomes necessary to make a direct hit with these bombs while the aircraft is at a height in which it is comparatively safe against actions by the enemy, so that it is possible to combat enemy aircraft in the air, and to hit land and water targets by the dispersion of the falling ignited material dropped from the aircraft.

It will moreover, also be possible to release by my device illuminating bodies from aircraft in flight which become illuminated at a desired distance above the ground determined by the length of the cable used, while the aircraft may keep at a distance from the ground in which it is comparatively safe from the enemy foe. The illuminating bodies, such as star-shells after their ignition, etc., can either be kept floating in the space or are carried along at the end of the cable to enable an illumination of certain localities of a certain terrain.

In the accompanying drawings forming a material part of this disclosure:

Fig. 1 illustrates an aeroplane equipped with an object releasing device constructed according to my invention.

Fig. 2 is a perspective view of a container for pamphlets to be released during the flight by means of the releasing means illustrated, with the container closed.

Fig. 3 is a view similar to Figure 2 with the container open.

Fig. 4 is a detail view of a guide ring used with my device.

Fig. 5 is a sectional view of two aligned conical bodies and cooperating parts.

Fig. 6 is a longitudinal section on line 6—6 of Figure 5.

As illustrated, the pamphlets 1 are packed into a container or wrapper 2 which is attached by means of the straps 3 and rings 4 and 5 to the guide ring 6.

The straps 3 are sewed to the ring 4, while the guide ring 6 is equipped with an eye 7 in which the ring 5 is held.

The container or wrapper 2 is made from a material suitable for the purpose intended, and in the present instance made of paper or bookbinder's linen or the like so that it may be folded when empty. Its bottom 8 has the form of a flap and has a front guard 9 preventing an accidental discharge of the pamphlets 1.

The wrapper is cut from one or more pieces of material which are suitably folded and combined by sewing or pasting, and paper or fabric strips 10 are used to strengthen the structure at the corners.

The straps 3 are attached to the wrapper 2 and at their places of attachment are reinforced by a fabric strip glued to the straps and wrapper.

To the bottom 8 a wire or rope 11 is attached so as to form a loop of a certain length. If the bottom 8 is made from pliant material it is suitably reinforced by a strengthening member 12 secured by means of the rivets 13 or the like so that the loop retains its length always.

At the front of the container 2 a tubular stem 14 is secured by means of rivets passed through an extension thereof adapted to receive and guide the pin 16.

A cord or cable 17 is attached by means of a seal 18 to the pin 16, and is guided through an opening 19 into the interior of the wrapper and through the opening 20 out of the wrapper, and then through opening 21 in one of the straps 3 to the guide ring 6. If the loop 11 is guided from within the wrapper through opening 22, the flap will close the bottom of the wrapper and the pamphlets will not accidentally leave the wrapper.

The other end of cord 17 is guided through an eye 23 on the guide ring 6 and through a releasing member 24 guided across guide ring 6 to an eye 25 on the opposite side of the ring where it is secured by means of a seal.

A spring 26 is attached to the guide ring 6 so as to allow the guide ring to be readily slipped over the cable 27 while simultaneously preventing an accidental slipping of the cable 27 from the guide ring 6. For this purpose the spring 26 is angularly bent above the opening of the guide ring 6 to conform to the thickness of the cable 27 and is guided across the guide ring 6 in such manner that its free end engages the outer margin of the ring 6 so that the cable 27 cannot open the spring.

One end of the cable 27 is suitably secured to the aircraft 27' while the other end is attached to the release member or conus 28 formed of a suitable material so as to permit of a smooth sliding of the guide ring 6 along the member 28.

In order to allow the reception and passage of cable 27 and its extension 32 the member 28 is provided with a suitable longitudinal bore; after the introduction of cable 27 the bore may wholly or partly be filled with molten metal to avoid friction. The member 28 is attached to the cable 27 in the following manner:

The end of cable 27 is split and formed into a loop 29 through which is passed a pipe 30 through which a rod 31 is guided, the ends of which are riveted to the member 28. Pipe 30 carries the inner ends of two members 33, 33', through the outer ends of which a bolt 34 is guided and secured which is also guided through a loop 35 of extension cable 32.

The opposite end of the extension cable 32 is formed into a loop 36 to which is attached a snap hook 37 for the reception of ring 38.

Upon the lower end of sleeve 39 a stop ring 40 is screwed of a diameter larger than the diameter of guide ring 6.

The sleeve 39 protects the snap hook 37 against accidental opening while ring 38 secures the ring 40 from falling down in case its connection with 39 is loosened.

The device operates as follows:

The pamphlets are packed into the wrapper 2 and the flap is closed as described, and the whole is then conveniently stored within the aircraft. During flight the cable 27 is paid out for a length required according to the desired distance from the ground at which the pamphlets are to be released.

If now the guide ring 6 is guided over cable 27 and the wrapper with the pamphlets to be dropped is released, the ring 6 will glide over member 28. While this is effected, the releasing member 24 is displaced from its position illustrated in Figure 2 into the position shown in Figure 4, so that cord 17 is tautened and draws the pin 16 from the loop 11 and the cover flap of wrapper 2 will be opened immediately and allow the contents as for instance the pamphlets to freely fall out into space, while the guide ring 6 with the empty wrapper 2 slides along the extension cable 32 and is finally prevented from falling off by ring 40.

It will be clear that in this manner as many packages as desired can be released in their consecutive order. The empty wrappers are collected on extension cable 32 and can then be drawn into the aircraft by means of the cable 27 and used anew.

If it should be desired to release the empty wrappings altogether, they may be dropped from the member 28 after removal of the extension cable 32, and by sliding the sleeve 39 along the extension cable 32 and releasing ring 38 from the snap hook 37 and unscrewing ring 40.

It will be understood that I have disclosed the preferred form of my device only and that I may make such changes in its general arrangement and in the construction of the minor details thereof as come within the scope of the appended claims without departure from the spirit of my invention and the principles involved.

Having thus described my invention, what I claim as new and desire to secure by Letters Patent is:

1. A device for releasing objects from an aircraft during flight comprising a cable of a predetermined length, a wrapper for said objects sliding along said cable and having a bottom closure, means for normally holding the wrapper closed, means for releasing said closing means during the downward movement of the wrapper on said cable to operate said wrapper closing means to allow a dropping of its contents and means for retrieving the empty wrappers.

2. A device for releasing objects from an aircraft in flight comprising a cable of a selected length, adapted to be paid out from the aircraft, a guide ring adapted to slide along said cable, a container connected to said guide ring for the objects to be dropped having a bottom closure, a means for holding said bottom closure closed during the initial drop, a connection between said guide ring and said closure means, a means on said cable adapted to be engaged by said guide ring to operate said bottom closure means to open the same for allowing a dropping of the contents of the container, and a means connected with said cable to collect the empty containers.

3. In a device for dropping objects from an aircraft during flight, a wrapper, having an opening in its wall, a cover adapted to close the bottom of the wrapper, a loop adapted to be drawn through said opening, a means engaging said loop to keep the cover closed, straps on said wrapper for suspending the same, strengthening means for said wrapper, a cable attached to said loop engaging means guided into said wrapper and out of the same, and said straps, means for guiding said cable, a guide ring to which said cable is attached, means to suspend the wrapper from said guide ring, and means to exert a pull on said cable to release the loop engaging means to allow an opening of the cover and a dropping of the contents of said wrapper.

4. In a device for releasing objects from an aeroplane during flight, a wrapper for the objects to be released, a closure for said wrapper, a guide ring, a spring on said guide ring, a cable along which said guide ring is slidingly guided between spring and ring, a stop member on said cable, a second cable connecting said wrapper with said guide ring normally slack, a movable member on said guide ring, means to be engaged by said movable member to tauten said slack cable upon the engagement of said stop member by said ring for opening the closure for the wrapper to let the objects drop from the same.

5. In a device for releasing objects from an aircraft, a cable of a selected length adapted to be paid out from the aircraft, a stop member on said cable, an extension cable suspended from said stop member, a sleeve on said extension, a snap hook in said sleeve suspended from said extension, a stop ring screwed upon said sleeve and a ring suspended from said snap hook for preventing the accidental loss of said snap ring.

6. In a device for dropping objects from an airplane in flight, a stop member, a cable to which said stop member is attached having its lower end formed into a loop, a pipe passed through said loop, a bolt passing through said pipe and secured at its ends in the walls of said stop, suspension members surrounding said pipe and having two depending arms, a bolt carried by said arms, and an extension cable having its upper end formed into a loop through which said bolt is guided, for the suspension of a sleeve.

7. In a device for dropping objects from an aeroplane in flight, a cable, an extension removably secured to said cable, a sleeve on said extension member, a snap hook suspended from said cable extension prevented from opening accidentally by the inner walls of said sleeve, a screw cap attached to the lower end of said sleeve, and a ring suspended from said snap hook for preventing the loss of said screw cap when becoming detached from said sleeve.

Signed at New York, in the county of New York, and State of New York, this 30th day of January, A. D. 1932.

ERICH DEUBEL.